(12) United States Patent
Schimpff et al.

(10) Patent No.: US 7,377,547 B2
(45) Date of Patent: May 27, 2008

(54) METHOD FOR STORING A SIDE CURTAIN AIR BAG

(75) Inventors: Cari Schimpff, Marysville, OH (US); Yoshihiko Morita, Dublin, OH (US); Toru Kobayashi, Dublin, OH (US); Daniel B. Winiger, East Liberty, OH (US)

(73) Assignee: Honda Motor Co., Ltd., Tokyo (JP)

( * ) Notice: Subject to any disclaimer, the term of this patent is extended or adjusted under 35 U.S.C. 154(b) by 165 days.

(21) Appl. No.: 11/348,070

(22) Filed: Feb. 6, 2006

(65) Prior Publication Data

US 2007/0182142 A1 Aug. 9, 2007

(51) Int. Cl.
*B60R 21/237* (2006.01)
(52) U.S. Cl. ............................... 280/743.1; 280/730.2; 493/458
(58) Field of Classification Search ............. 280/743.1, 280/730.2; 493/449, 457, 458
See application file for complete search history.

(56) References Cited

U.S. PATENT DOCUMENTS

| | | | |
|---|---|---|---|
| 5,429,385 A | | 7/1995 | Kamiji et al. |
| 5,730,463 A | * | 3/1998 | Fisher et al. ............. 280/743.1 |
| 6,371,512 B1 | | 4/2002 | Asano et al. |
| 6,976,705 B2 | * | 12/2005 | Klaiber et al. ........... 280/743.1 |
| 7,261,682 B2 | * | 8/2007 | Crookston et al. .......... 493/457 |
| 2002/0158451 A1 | * | 10/2002 | Nusshor .................. 280/730.2 |
| 2003/0116947 A1 | * | 6/2003 | Yokoyama et al. ....... 280/730.2 |
| 2006/0172874 A1 | * | 8/2006 | Sugaya et al. ............. 493/458 |

* cited by examiner

*Primary Examiner*—Ruth Ilan
*Assistant Examiner*—George D. Spisich
(74) *Attorney, Agent, or Firm*—Rankin, Hill & Clark LLP; Mark E. Duell

(57) ABSTRACT

A method of folding together a vehicle side curtain airbag is provided that includes bending a base section of an extended air bag toward the outboard side of the vehicle and fully over onto a middle section of the air bag located directly above the base section. The adjacent base and middle sections are then rolled, as a group, by first moving a crease line between the base and middle sections toward the outboard side of the vehicle, then curling the crease line back toward the unrolled portion of the base and middle sections and then rolling the remainder of the unrolled portion of the base and middle sections. A top section of the airbag is collapsed in a pleated manner.

4 Claims, 4 Drawing Sheets

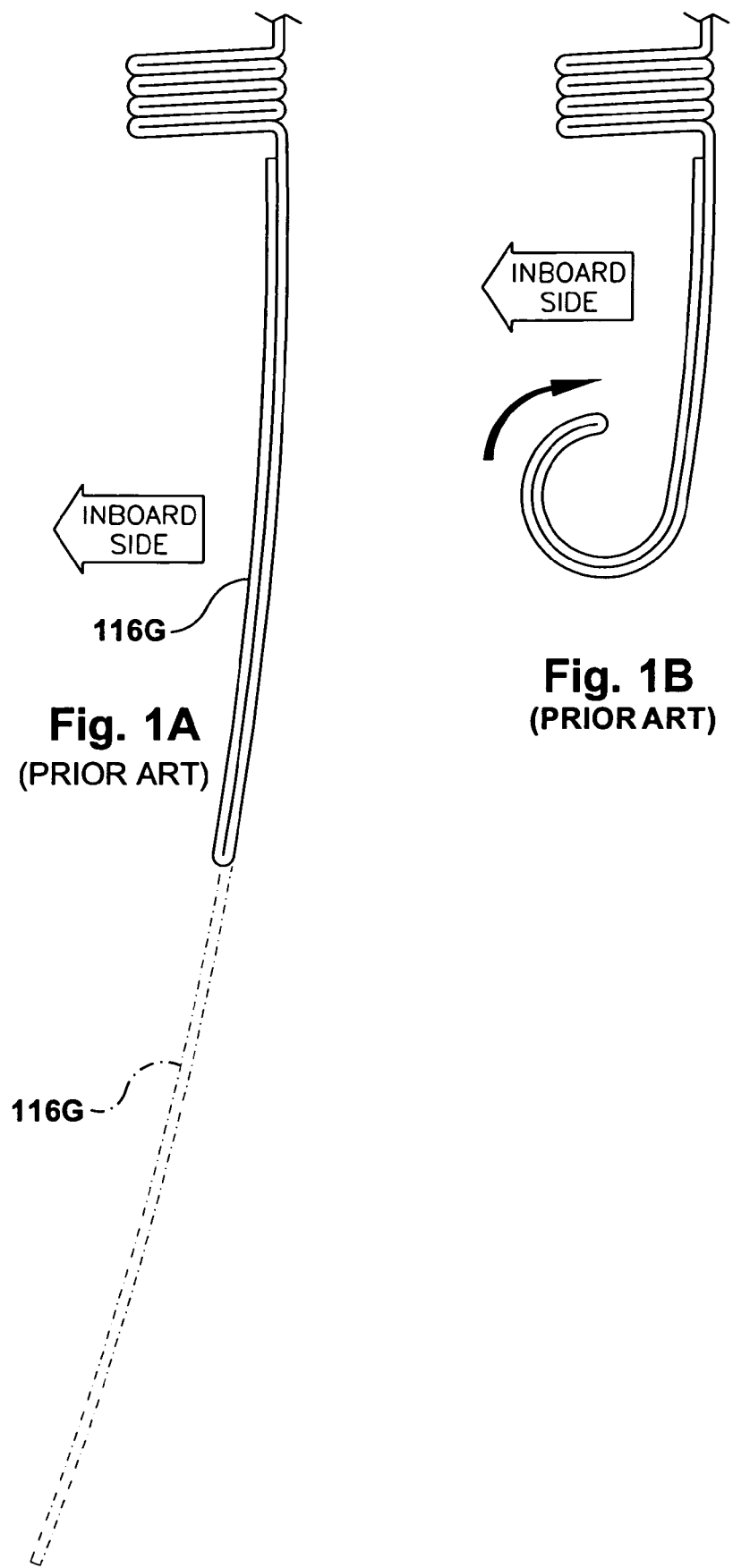

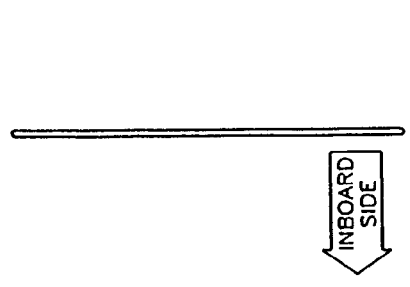
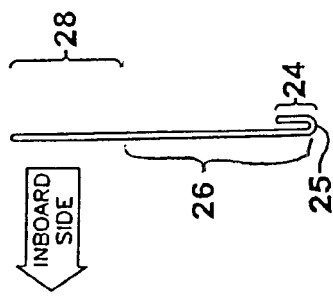
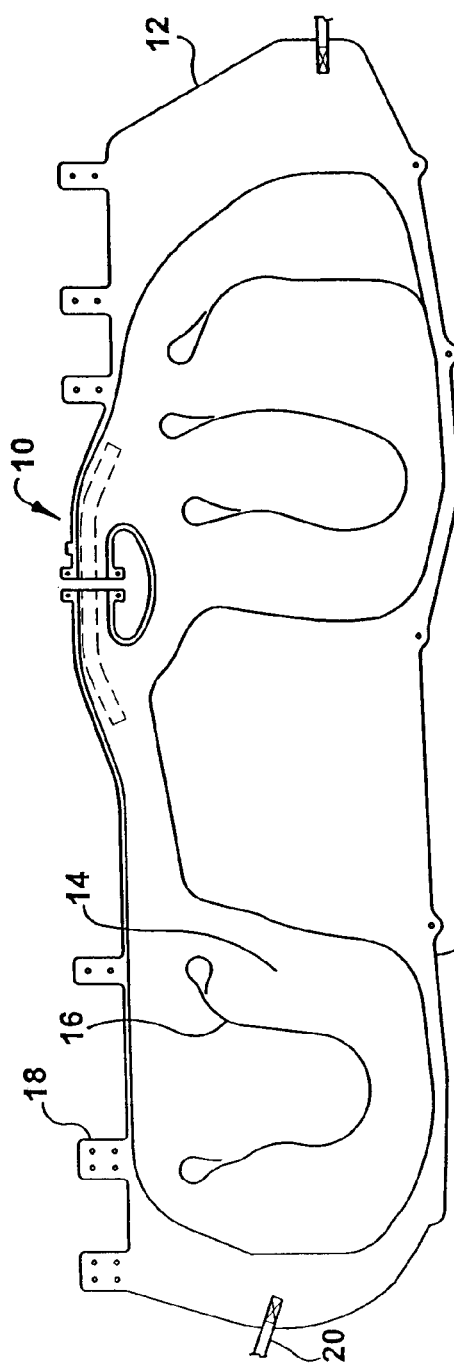
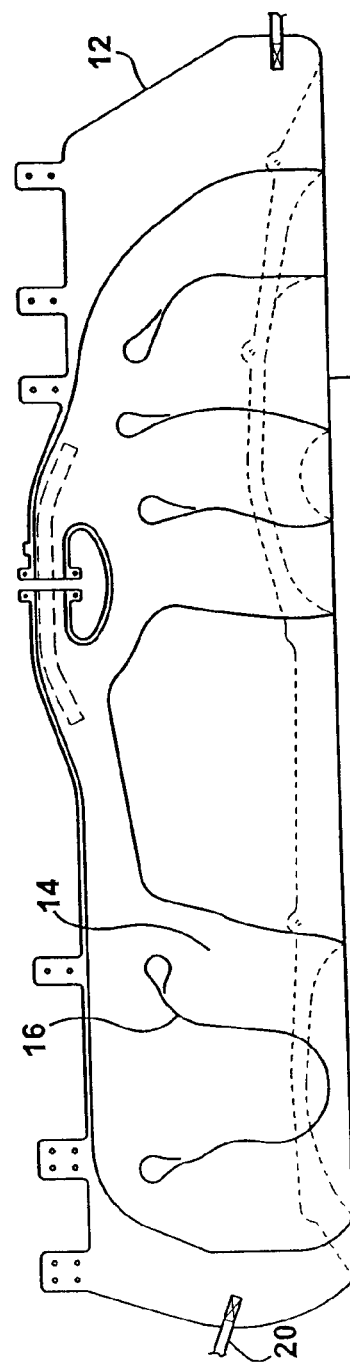

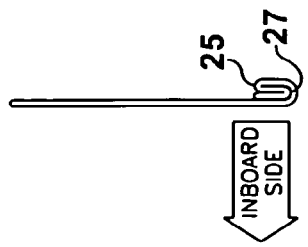
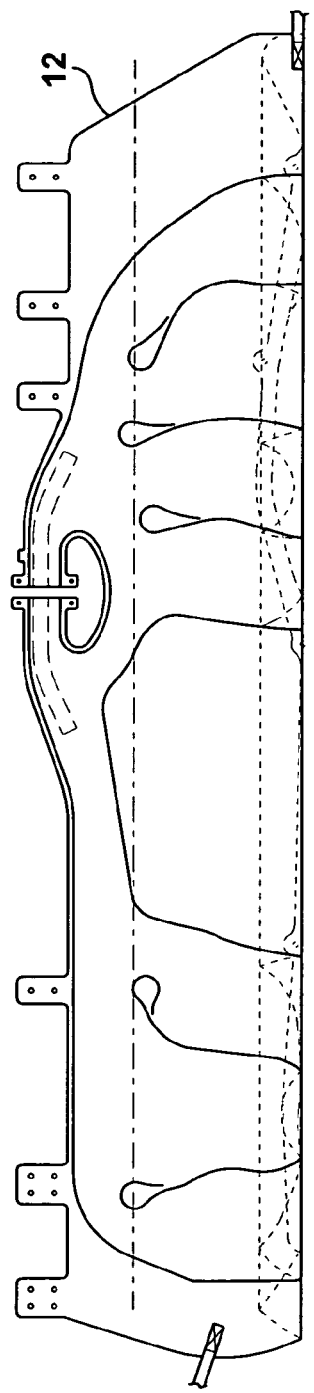
Fig. 5B
Fig. 5A
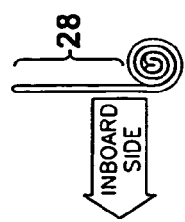
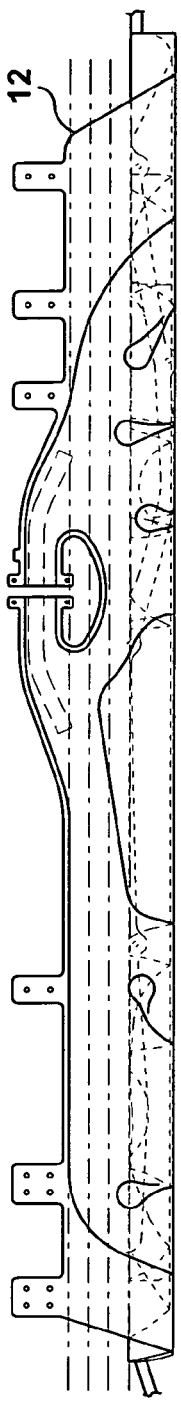
Fig. 6B
Fig. 6A
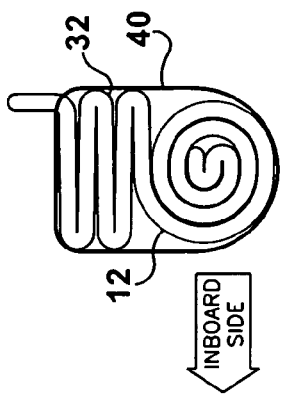
Fig. 7

METHOD FOR STORING A SIDE CURTAIN AIR BAG

BACKGROUND OF THE INVENTION

1. Field of the Invention

This invention relates to automobile protective systems, namely side curtain type airbags and the manner in which individual airbags are folded together and stored prior to use.

2. Description of Related Art

Air bags are commonly used safety devices in automobiles and other fast moving passenger vehicles. Commonly, air bags are provided to protect against head on collisions. Side impact air bag protection is now becoming a more common accessory in vehicles. Curtain type air bags, used to protect against side impacts, typically have a greater surface area than front impact type airbags, thus, rolling, packing and storing curtain type air bags is challenging. Adding to the challenge of storing curtain air bags is the limited amount of free space above the doors on the vehicle's roofline and, in general, above the roofliner. The air bag equipment, further, must be isolated from other wiring and drainage devices when located in common areas. Additionally, the air bag must be hidden when not deployed while still being effectively deployable.

U.S. Pat. No. 6,371,512 to Asano et al. describes a typical side curtain air bag. Referring to FIGS. 10A and 10B of the Asano et al. patent, reproduced herein as prior art FIGS. 1a and 1b, one method of storing an uninflated curtain air bag is illustrated with the leftmost portion being located toward the vehicle inside (indicated as "inboard side"). A turned back portion 116G contacts a length of the air bag located directly above the turned back portion 116G. These two portions, in combination referred to as a rolled-up portion, are rolled by first bringing the lowest end of the rolled-up portion toward the inside of the vehicle. The lowest end is then curled until it is completely enclosed by the remainder of the rolled-up portion. The curled portions are then simply rolled upward causing the remainder of the rolled-up portion to curl around the exterior of the portion being rolled. An upper section, located directly above the rolled-up portion is collapsed in a pleated manner. The rolled-up portion is often repositioned so that the upper pleated section is substantially covered with the rolled-up portion.

One drawback to the configuration of the prior art, where the rolled-up portion is rolled toward the inside of the vehicle, is the magnitude and direction of force generated upon the actuation of the air bag system. As the air bag fills with air and the air bag unrolls, upon each revolution, the remaining rolled portion is forced toward the inside of the vehicle and through the vehicle's roofliner and garnish. This sometimes results in an occupant of the vehicle being contacted by the air bag while the air bag is deploying and risks injury to the vehicle occupant. Additionally, excessive force is generated against the roofliner and garnish. Although some is required force to dislodge the roofliner from a position overlapping the garnish, often excess force fractures the garnish which can further injure the vehicle occupant. Replacement of the garnish is also, then required.

What is desired is an air bag that can be deployed using less force directed to the inside of the vehicle than what is used in the existing art and which will not create injury concerns for vehicle occupants.

SUMMARY OF THE PRESENT INVENTION

The present invention overcomes disadvantages in the prior art by providing an improved method of folding and storing a side curtain air bag. The air bag unfolds toward the outboard side of the vehicle. The new method prevents excessive force from being applied to the roofliner and garnish which in turn prevents a failure condition in the garnish. Although the air bag expands inward, toward the roofliner during initial inflation, a large amount of the force from the air bag is directed outward to the vehicle frame or skin which has more strength than the garnish and roofliner. As a result, sufficient force is generated to displace the roofliner away from the garnish, but not break the garnish. Further, as the airbag of the present invention is deployed, it tends to stay near to the vehicle windows and side frame, rather than getting into the passenger compartment. Hence, the inventive air bag is advantageously and desirably positioned without risk of contacting the occupant's head during deployment and causing potential injury.

BRIEF DESCRIPTION OF THE DRAWINGS

FIG. 1A is a side elevational view of a prior art air bag with a portion doubled over toward the inside of the vehicle;

FIG. 1B is a side elevational view of a prior art air bag with a portion rolled toward the inside of the vehicle;

FIG. 3A is a front elevational view of the air bag of the present invention in an unfolded form;

FIG. 3B is a side elevational view of the air bag of the present invention in an unfolded form;

FIG. 4A is a front elevational view of the air bag of the present invention with a section folded toward the outboard side of the vehicle;

FIG. 4B is a side elevational view of the air bag of the present invention with a section folded toward the outboard side of the vehicle;

FIG. 5A is a front elevational view of the air bag of the present invention with a section partially rolled toward the outboard side of the vehicle;

FIG. 5B is a side elevational view of the air bag of the present invention with a section partially rolled toward the outboard side of the vehicle;

FIG. 6A is a front elevational view of the air bag of the present invention with a section rolled toward the outboard side of the vehicle;

FIG. 6B is a side elevational view of the air bag of the present invention with a section rolled toward the outboard side of the vehicle; and FIG. 7 is a side elevational view of the air bag of the present invention with a section rolled toward the outboard side of the vehicle and a section including pleated folds.

DETAILED DESCRIPTION OF THE INVENTION

Figure 2A:
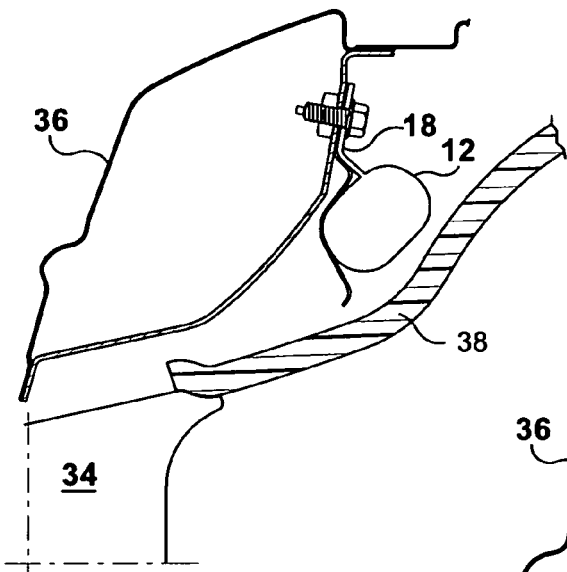
FIG. 2A is a sectional view of an airbag of the present invention configured within a vehicle before being deployed.

Referring to the drawings, FIGS. 3A and 3B illustrate a preferred air bag 12 that is part of an air curtain system 10. An improved method of folding the air bag 12 together is described in more detail below.

FIGS. 3A and 3B show the air bag 12 in a completely unfolded or extended state. The air bag 12 includes a series of inflatable portions 14 and seams 16 located between the inflatable portions 14. To hold the air bag 12 in place, at the top of the air bag 12 are a series of mounting flaps 18 that attach directly to the vehicle body in a roof rail area. The air bag 12 also includes at least one tether 20 on each end of the length of the air bag 12 that also attach to the vehicle body.

The air bag bottom edge 22 is not affixed to anything, but rather secured within the folded airbag 12 that is stored in a position hidden from the view of the vehicle occupants. The folding process includes starting from the bottom edge 22 and by a combination of rolling and doubling over, reducing the exposed surface area of the air bag 12.

Referring to FIGS. 4A and 4B, the air bag 12 includes a base section 24, a top section 28 and a middle section 26 therebetween. The base section 24 and middle section 26 are not defined by a specific width, but rather are defined by the location of the crease 25 therebetween when the base section 24 is first doubled over onto the middle section 26. The base section 24 is the width below the crease 25 and the middle section 26 is the width between the crease and below the top section 28. Similarly, the exact width of the top section 28 is defined by the amount of the air bag that is collapsed rather than rolled at an upper end 28.

Figure 2B:
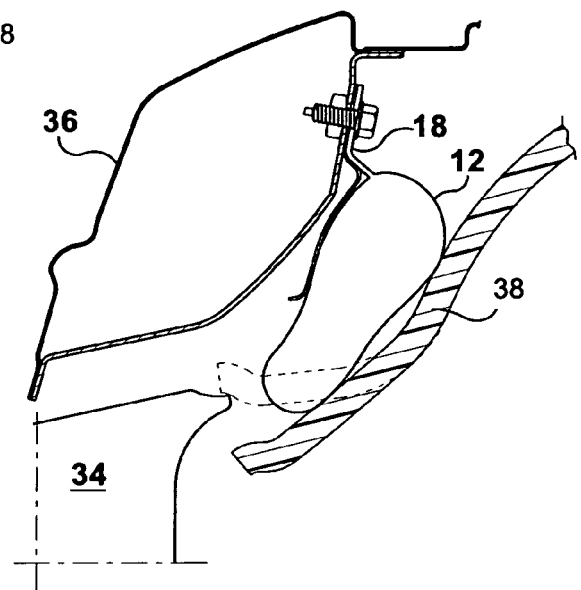
FIG. 2B is a sectional view of an airbag of the present invention configured within a vehicle during deployment.
Figure 2C:
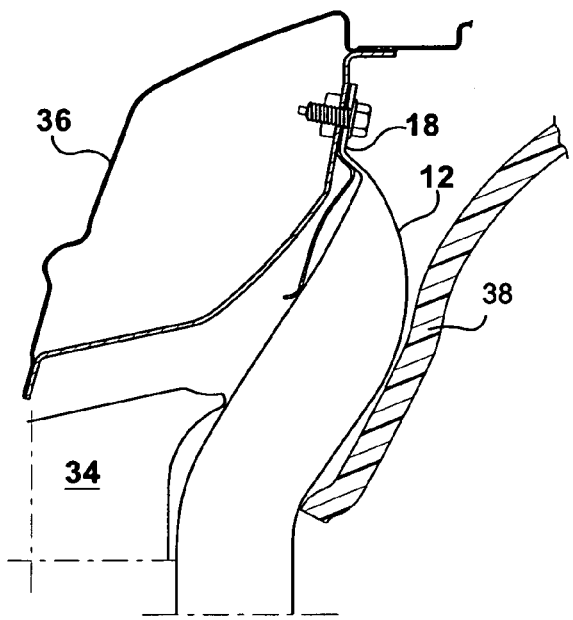
FIG. 2C is a sectional view of an airbag of the present invention configured within a vehicle after deployment.

Referring to FIG. 7, preferably, once the air bag 12 has been sufficiently folded, the air bag 12 is bound in the bunched form using a flexible material 40 that can be easily ruptured when the air bag 12 is inflated. Referring to FIGS. 2A-2C, the bound air bag 12 is stored along the roof line of a vehicle just above the driver's side or passenger side doors(s) and along the length of the vehicle interior in a manner well known in the art. The bound air bag 12 is configured above the vehicle's roofliner 38 and garnish 34, and is secured to the vehicle frame 36.

The air bag 12 is folded together using a series of doubling over, rolling and collapsing steps. FIGS. 3A and 3B show the air bag 12 in an extended state. Referring to FIGS. 4A and 4B, the base section 24 is then bent toward the outboard side of the vehicle and doubled over and onto the middle section 26. Preferably, the base section 24 overlaps approximately one quarter of the middle section 26 when completely doubled over.

Referring to FIGS. 5A and 5B, the air bag 12 is further folded by rolling the adjacent base and middle sections 24 and 26, as a group, upward. First, the crease 25 between the base section 24 and middle section 26 is moved toward the outboard side of the vehicle. Then, the extended portion of the adjacent base and middle sections 24 and 26 is curled such that the crease is directed back toward the middle section 26 that has not been rolled yet. As this occurs, preferably, an additional crease 27 is formed in the base section 24. Referring to FIGS. 6A, 6B and 7, the remainder of the base and middle sections 24 and 26 are rolled on top of the already rolled portions of the base and middle sections 24 and 26. Preferably, the crease 25 progresses between two and four full rotations before the rolling process is complete.

The top section 28 is then collapsed in an accordion or pleated manner well known by those skilled in the art to complete the folding process. Preferably, two full pleats 32 are produced in the collapsing process. The mounting flaps 18, preferably, are not folded because they must remain accessible for attachment to the vehicle. The straps 20, although the section of the air bag 12 they attach to has been rolled, protrude from the air bag 12 such that the straps 20 may be attached to the body of the vehicle.

The base section 24 of the air bag 12 is described above as overlapping one quarter of the middle section 26 when completely folded. In alternate embodiments of the invention, the base section 24 may overlap anywhere from one quarter to all of the middle section. When the base section 24 is doubled over to overlap a significant portion of the middle section, no additional creases are formed in the subsequent rolling steps.

Referring to FIGS. 2A and 2B, deployment of the air bag 12 is shown. During a vehicle collision the air bag 12 deploys by being filled with gas. Initially, expansion of the top section 28, that is collapsed in an accordion manner, causes contact against the roofliner 38 and dislodges the roofliner 38 from an overlapped position on the garnish 34. As the air bag 12 is further filled with gas the middle section 26 unrolls and expands the air bag 12 between the roofliner 38 and garnish 34. While unrolling, the predominant amount of force caused by the gas entering the air bag 12 is directed against the vehicle skin or frame 36 and then garnish 34. Thus, additional deformation of the garnish 34 does not occur initially and then, referring to FIG. 2C, the airbag 12 stays up against the vehicle sidewall and not in a position that would contact the vehicle occupants. After the middle section 26 unrolls, the base section 24 unfolds and the air bag 12 is in a fully expanded configuration and positioned to protect the passengers in the vehicle.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A method of folding together a vehicle side curtain airbag, spatially represented with respect to the future air bag position within the vehicle after installation, comprising the steps of:

bending a base section of an unfolded air bag toward the outboard side of the vehicle and doubling over onto a middle section of the air bag located directly above the base section, the doubling over creating a crease line between the base and middle sections;

rolling the adjacent base and middle sections, as a group, by first moving the crease line toward the outboard side of the vehicle, then curling the crease line back toward the unrolled portion of the middle section;

creating a second crease within the base section and the middle section overlapped by the base section and then rolling the remainder of the unrolled portion of the middle section; and collapsing a top section of the extended airbag in a pleated manner.

2. The method of claim 1, wherein when doubled over, the base section overlaps about one quarter of the middle section.

3. The method of claim 1, further including the step of placing the folded air bag between a frame and roofliner of the vehicle.

4. A method of utilizing a side curtain air bag in a vehicle, spatially represented with respect to the future air bag position within the vehicle after installation, comprising the steps of:

bending a base section of an unfolded air bag toward the outboard side of the vehicle and doubling over onto a middle section of the air bag located directly above the base section, the doubling over creating a crease line between the base and middle sections;

rolling the adjacent base and middle sections, as a group, by first moving the crease line toward the outboard side of the vehicle, then curling the crease line back toward the unrolled portion of the middle section;

creating a second crease within the base section and the middle section overlapped by the base section and then rolling the remainder of the unrolled portion of the middle section;

collapsing a top section of the extended airbag in a pleated manner; and fixing the folded airbag between a frame and headliner of a vehicle; wherein upon inflation of the air bag, the headliner is dislodged from an interlocked position with a garnish on the vehicle, but neither the headliner nor the garnish are broken.

* * * * *